Oct. 18, 1960  F. FISCHER ET AL  2,956,491
AUTOMATIC DIAPHRAGM CONTROL DEVICE
Filed Jan. 3, 1956  3 Sheets-Sheet 1

INVENTORS
FRANZ FISCHER &
WOLFGANG MUELLER-HERGET
BY
Kenyon & Kenyon
ATTORNEYS.

Oct. 18, 1960     F. FISCHER ET AL     2,956,491
AUTOMATIC DIAPHRAGM CONTROL DEVICE
Filed Jan. 3, 1956     3 Sheets-Sheet 3

INVENTORS.
FRANZ FISCHER &
WOLFGANG MUELLER-HERGET
BY Kenyon and Kenyon
ATTORNEYS.

United States Patent Office 2,956,491
Patented Oct. 18, 1960

2,956,491

AUTOMATIC DIAPHRAGM CONTROL DEVICE

Franz Fischer and Wolfgang Mueller-Herget, Jackson Heights, N.Y., assignors to Bulova Research and Development Laboratories, Inc., Woodside, N.Y., a corporation of New York Filed Jan. 3, 1956, Ser. No. 557,014

6 Claims. (Cl. 95—64)

The invention relates generally to diaphragms for photographic lenses, and more particularly to apparatus adapted automatically to vary the stop or aperture size in a camera lens as a function of the amount of light incident thereto.

In order to compensate for changes in illumination, conventional cameras usually include a manually adjustable diaphragm to control the size of the aperture in the lens system. It has heretofore also been known to provide a photoelectrically-actuated device to adjust a camera diaphragm in proportion to the brightness of an object being photographed. Such automatic devices as are disclosed, for example, in the patent to Galyon 2,206,086, require the use of specially designed diaphragm strutures. Generally these special structures are constituted by a pair of cooperating plates which are brought together or retracted to define an aperture of variable size. Such variable apertures however are not of uniform circular cross-section throughout their operating range and at best represent a design compromise.

Accordingly, it is the primary object of the invention to provide an improved apparatus for automatic control of diaphragms in photographic lenses according to the amount of incident light so as to compensate for changes in illumination.

It is also an object of the invention to provide individually actuated stops of different size in conjunction with a common lens barrel, each stop being photoelectrically controlled so that its selective insertion in the barrel depends on the level of illumination.

A further object of the invention is to provide a sector shaped diaphragm having a plurality of perforations of different sizes, the diaphragm operating in conjunction with a common lens barrel and being photoelectrically controlled so that the selective insertion of a particular perforation in the barrel depends on the level of illumination.

Still another object of the invention is to provide stop means whereby the effective aperture of the diaphragm, in the course of stop movement, is never less than that of the smallest stop.

Briefly stated, in one embodiment of an automatic diaphragm apparatus in accordance with the invention, there is provided a plurality of stop elements having apertures of different size and means individually to introduce the stops to the camera lens in overlapping relation whereby the apertures of different size lie in axial registration. Light responsive means are operatively coupled to each stop selectively to effect the introduction thereof when incident illumination attains a predetermined level to which the particular aperture size is appropriate.

In another embodiment of the invention the diaphragm is constituted by a sector-shaped element having perforations of different sizes, and means selectively to introduce the perforations into the lens barrel in accordance with incident illumination whereby the perforation size is appropriate to the level of incident illumination.

For a better understanding of the invention as well as other objects and further features thereof, reference is had to the following detailed description to be read in conjunction with the accompanying drawing, wherein like components in the various views are identified by like reference numerals.

Figure 1:
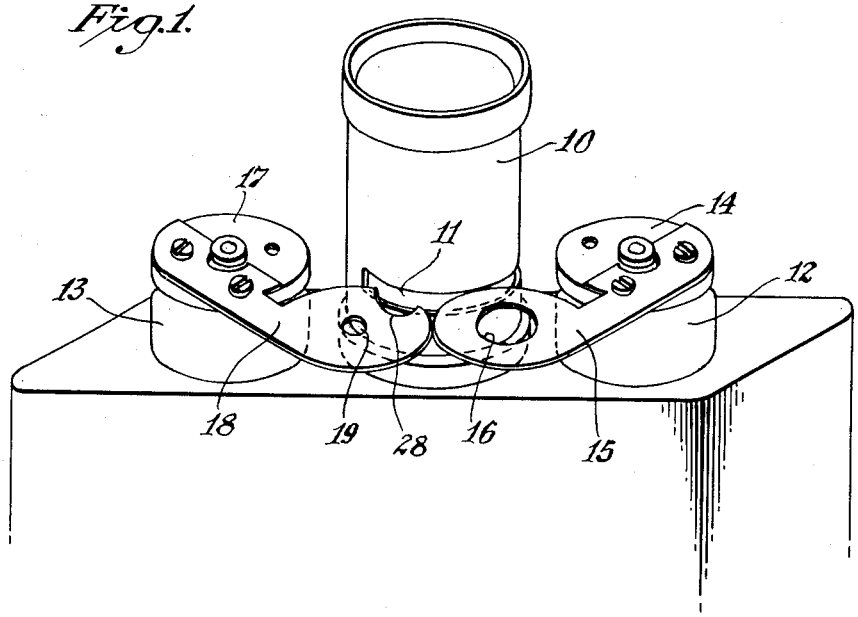
Figure 1 is a perspective view of a lens barrel provided with a first embodiment of an automatic diaphragm device in accordance with the invention.
Figure 2:
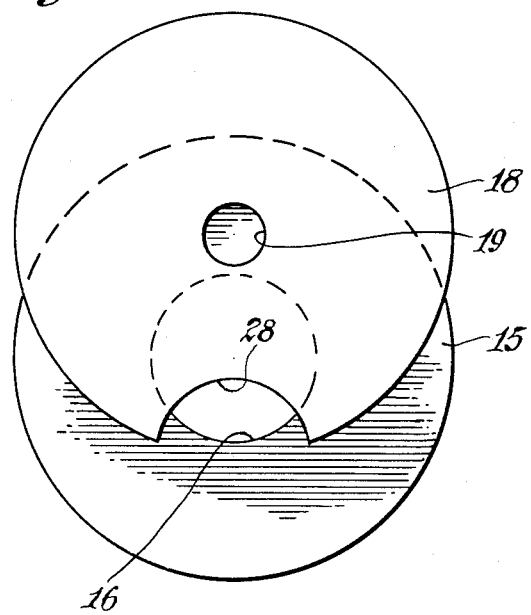
Figure 2 illustrates the movement of one stop with respect to its effect on aperture size.
Figure 3:
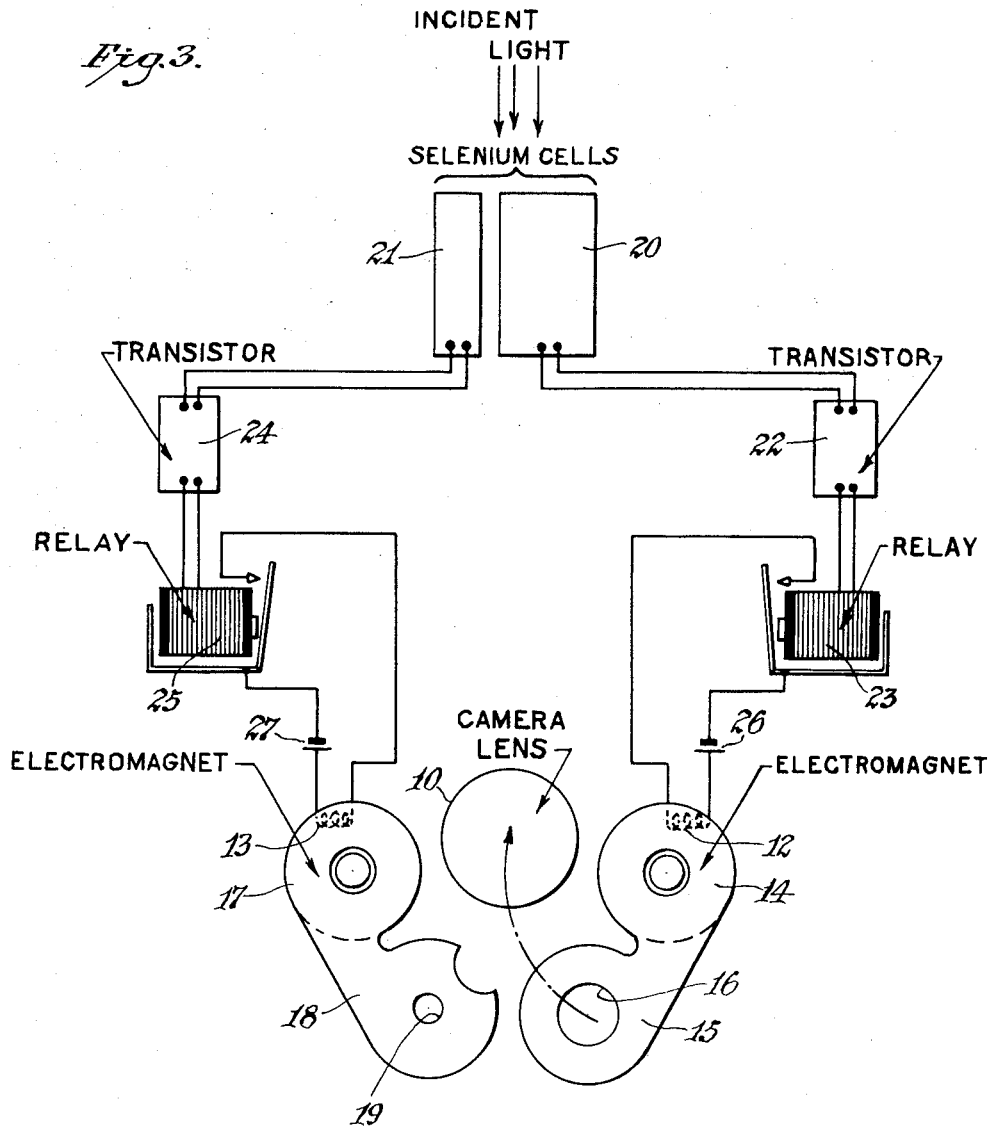
Figure 3 is a schematic circuit diagram of the automatic diaphragm device of Fig. 1 and its associated control means.

In carrying the invention illustrated in Figs. 1 to 3 into effect, individual stops are used, each being constituted by an opaque plate having an aperture therein. The apertures are circular in shape and of different size, and the plates are inserted as required in a slot formed in the lens barrel. Any convenient number of plates may be used but for purposes of explanation, it will be assumed that but two plates are required. If neither plate is introduced into the lens barrel, the lens will operate at its full aperture.

Referring now to Fig. 1, there is shown a photographic camera including a cylindrical lens barrel 10 having an arcuate slot 11 formed transversely therein. Two electromagnets 12 and 13 are provided on either side of the lens mount, each being in the form of a rotary solenoid. Electromagnet 12 includes an armature 14 which is rotatable against the biasing action of a spring through an angle of about 45° when an energizing voltage is applied to the solenoid. Integral with armature 14 is a plate or stop element 15 having a disc-shaped portion provided with a central aperture 16. Electromagnet 13 is of similar design and includes an armature 17. Integral with armature 17 is a second stop element 18 having an aperture 19 of a smaller size than aperture 16. The two aperture plates are at slightly different levels to clear one another, and the slot is of sufficient width to accommodate both stop plates at once in overlapping relationship, the apertures thus being in axial registration.

If neither stop is in the lens barrel, the lens will operate at its full aperture. The insertion of stop 15 with the larger hole will reduce the amount of light to about a quarter of the full value, while the insertion of the smaller stop, either with or without the presence of the large stop 15, will reduce the admitted light to about one-sixteenth of the full value. It is to be understood, however, that these stop sizes are cited by way of illustration only, and many other light values are possible with stops of different sizes.

Thus given a lens of say $f/4$ aperture and two diaphragm apertures of $f/8$ and $f/16$, a useful range can be covered without exceeding the tolerance of a black-and-white film. When electromagnet 12 is energized, stop 15 is shifted into position and when electromagnet 13 is energized, stop 18 is shifted into position in overlapping relationship with stop 15. When the electromagnets are deenergized, their springs act to withdraw the stops.

The automatic control is effected by means of photocells which may be of selenium and which are of different active areas or sensitivities. The cells may be arranged to accept light in cones of different angles. As shown in Fig. 3, two selenium cells 20 and 21 are provided in side by side relation. The cell may be mounted on the camera itself or in an adjacent position so as to expose the cells to substantially the same illumination as is received by the lens, or in proportion thereto.

Photocell 20 is connected through an amplifier 22 to a relay 23. The relay is arranged to apply energizing voltage from a battery 26 to electromagnet 12 when the amplified voltage from the cell exceeds a predetermined level, thereby operating stop 15. Photocell 21 is similarly connected through an amplifier 24 to a relay 25 which controls energization of electromagnet 13 to operate the stop 18, the electromagnet being energized by a battery 27. The amplifiers may be constituted by single stage transistor circuits or subminiature tube circuits. The two amplifier circuits and the associated relays as well as the operating batteries may conveniently be enclosed in a single compact container mounted on the camera.

The relative sensitivities or response characteristics of the two photocells are such that if illumination is below a certain value, neither cell will operate its relay and the lens aperture will be fully open. At a predetermined higher level, the more sensitive or larger cell 20 will operate to insert the larger stop 15 in the lens. With still more illumination the second and smaller cell 21 will come into action and the smaller stop 18 will be inserted into the slot of the lens barrel. If the light is diminished, the reverse action takes place, the relays falling out one by one though at a somewhat lower excitation than was necessary to close them. The difference between the rising and falling light action is caused by the hysteresis of the relays but will still be within the film tolerance.

In place of photocells of different size, two cells having the same sensitivity characteristics may be used in conjunction with light masks of different dimension so that one cell provides a greater electrical output than the other in response to a like degree of incident light.

When one of the stops is already in place in the lens barrel, the insertion of a second stop will temporarily close the aperture more or less completely, and an attempted exposure made during the movement of the second stop would be wasted. For this reason, as shown in Fig. 2, an arcuate notch 28 is cut into the periphery of the second plate 18 which allows light to pass through the first stop 15 until the hole of the second stop is registered in position. In this way the effective aperture, while the stops are in motion, is never less than that of the smaller stop. If more than two diaphragms are used, a notch of this type is provided in all stop plates, excepting the one having the largest hole.

In the above-described arrangement, the energization of a rotary electromagnet effects movement of the diaphragm plate carried thereby into operative position within the lens mount, and when the electromagnet circuit is broken, the diaphragm is retracted by a spring. Alternatively, the arrangement may be made such that the diaphragm with the largest hole is inserted by a spring and withdrawn by an electromagnet. In this way the middle aperture, which presumably will be most frequently used, is maintained without expenditure of current, which current is required only for the two extreme apertures. Moreover in this case only one rotary electromagnet is energized at one time and the maximum current drawn from the battery is thereby reduced.

Figure 4:
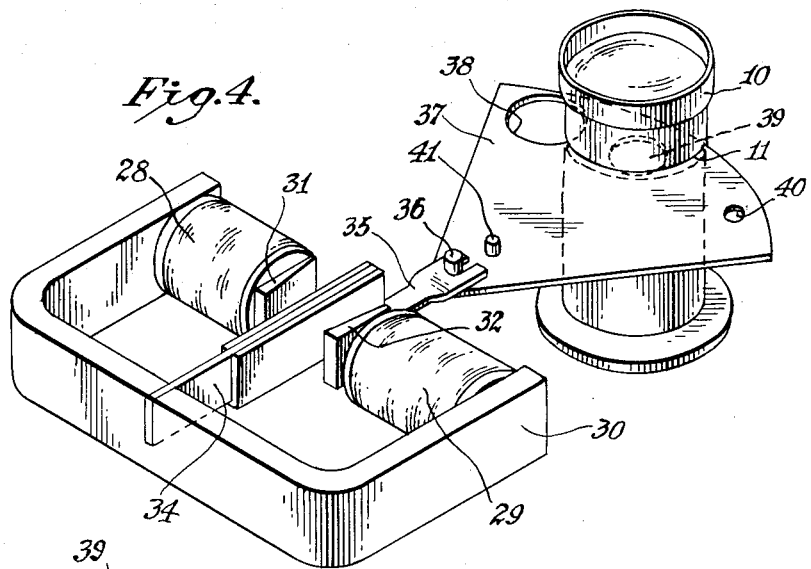
Figure 4 is a perspective view of a second embodiment of an automatic diaphragm device in accordance with the invention.
Figure 5:
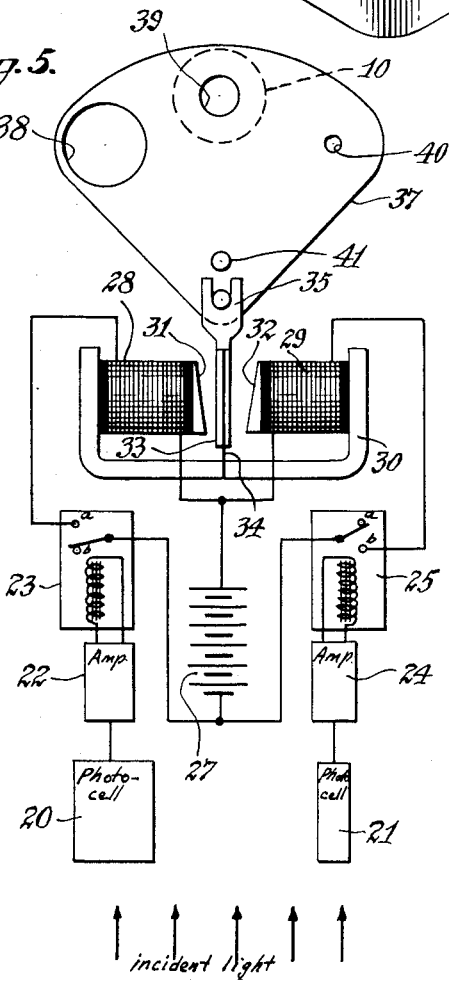
Figure 5 is a schematic circuit diagram of the automatic device of Fig. 4 and its associated control means.

Referring now to the second embodiment of the invention shown in Figs. 4 and 5, symmetrically disposed on either side of the lens barrel 10 are two electromagnets 28 and 29. The electromagnets are perpendicularly mounted on the arms of a U shaped yoke 30 and are provided with wedge-shaped pole pieces 31 and 32. Intermediately disposed between pole pieces 31 and 32 is a common armature 33 mounted on a flat spring 34 whose end is secured at the midpoint of the base of yoke 30. Thus armature 33 is rotatable through a small angle by bending of spring 34, the direction of flexure depending on which of the electromagnets is energized.

Integral with armature 33 is a fork-shaped element 35 which engages a pin 36 projecting upwardly from the apex of a sector-shaped diaphragm plate 37. Plate 37 is pivoted for rotation about a pin 41 which is disclosed adjacent the apex on a radial line bisecting the sector.

Thus an angular deflection of the armature 33 in one direction effects a deflection of the diaphragm 37 in the opposite direction. The arcuate end portion of the diaphragm is inserted in the slot 11 of the lens barrel and is provided at spaced positions with three perforations or apertures 38, 39 and 40 of progressively different size.

When neither electromagnet is energized, the fork 36 is centered by spring 34 and armature 33 remains in the center position. Consequently the middle aperture 39 is on the axis of the camera lens when the electromagnets are de-energized. When electromagnet 28 is energized aperture 38 is aligned with the lens, whereas when electromagnet 29 is energized aperture 40 is registered with the lens.

As illustrated in Fig. 5, the automatic control of the diaphragms is effected by means of photocells 20 and 21 connected through transistor amplifiers 22 and 24 to relays 23 and 25, respectively. Relays 23 and 25 are each provided with upper fixed contacts $a$ and lower fixed contacts $b$, the upper contacts being engaged by the armature in the rest condition and the lower contacts being engaged in the energized condition of the relay. Battery 27 is connected through the $a$ contact of relay 23 to electromagnet 28 whereby this electromagnet is energized when relay 23 is at rest and is de-energized when relay 23 is actuated. Battery 27 is also connected through the $b$ contact of relay 25 to electromagnet 29 whereby this electromagnet is de-energized when relay 25 is at rest and is energized when relay 25 is actuated.

The relative response characteristics of photocells 20 and 21 are such that for a given range of incident illumination intensities, the output of cell 20 will be insufficient at the lowest point in the range to energize relay 23. Hence battery 27 will be connected to electromagnet 28, the armature 33 will be deflected toward pole piece 31 and the largest aperture 38 will be placed in registration with camera lens 10. Thus at the lowest level of incident illumination the largest aperture will be in place. For purposes of illustration we shall assign the values 10 to 40 as representing the extremities of the range, 10 being the lowest point.

When the illumination attains a higher point, say 20 the output of cell 20 will be such that relay 23 is actuated, thereby de-energizing electromagnet 28. Since neither electromagnet is energized, the diaphragm plate is held by spring 34 at its center position and the middle sized aperture 39 is inserted in the lens barrel. This is the position actually shown in Fig. 5.

When the illumination attains a still higher point, say 30, the output of cell 21 will now be sufficient to actuate relay 25, thereby deflecting armature 33 toward pole piece 32 and placing the smallest aperture 40 into registration with lens 10. Thus, in the center portion of the illumination range, i.e. from 20 to 30, neither electromagnet is energized and there is no expenditure of current. Since, illumination in the center portion presumably is the most commonly encountered level, current consumption from battery 27 is minimized.

While there has been shown what is considered to be a preferred embodiment of the invention, it will be manifest that many changes and modifications may be made therein without departing from the essential spirit of the invention. It is intended, therefore, to cover in the annexed claims all such changes and modifications falling within the true scope of the invention.

What is claimed is:

1. Automatic diaphragm apparatus adapted selectively to adjust the aperture size in the camera lens to compensate for illumination changes, said apparatus comprising a barrel for supporting said lens on said camera and provided with a slot opening, diaphragm means including a plurality of apertures of different size insertable into said slot and light responsive means operatively coupled to said diaphragm means and activated in a stepwise manner when incident illumination attains predetermined levels selectively to effect the introduction of an aperture into said barrel whose size is appropriate to the actual level of illumination, said light responsive means including at least two photocells having different sensitivity characteristics, the characteristic of each cell being related to a respective aperture size, and mechanism responsive to the output of each photocell to cause said diaphragm means to assume the appropriate aperture position.

2. Automatic diaphragm apparatus adapted selectively to adjust the aperture size in a camera lens to compensate for illumination changes, said apparatus comprising a barrel for supporting said lens on said camera and provided with a slot, a diaphragm plate provided with a plurality of apertures of different size insertable into said slot, and light responsive means operatively coupled to said plate and activated in a stepwise manner when incident illumination attains predetermined levels selectively to effect registration of an aperture with said lens whose size is appropriate to the actual level of illumination, said light responsive means including at least two photocells having different sensitivity characteristics, the characteristic of each cell being related to a respective aperture size, and mechanism responsive to the output of each photocell to cause said plate to assume the appropriate aperture position.

3. Automatic diaphragm apparatus adapted selectively to adjust the aperture size in a camera lens to compensate for illumination changes, said apparatus comprising a barrel for supporting said lens and provided with a slot, a sector-shaped diaphragm plate provided with a plurality of apertures of different sizes in the arcuate portion thereof, said arcuate portion being inserted in said slot and said plate being pivotally mounted adjacent the apex for angular rotation thereof, whereby each of said apertures may be registered with said lens depending on the angular position of said plate, and light responsive means operatively coupled to said plate and activated in a stepwise manner when incident illumination attains predetermined levels to adjust the angular position of said plate to effect registration of an aperture with said lens whose size is appropriate to the actual level of illumination, said light responsive means including at least two photocells having different sensitivity characteristics, the characteristic of each cell being related to a respective aperture size, and mechanism responsive to the output of each photocell to cause said plate to assume the appropriate aperture position.

4. Automatic diaphragm apparatus adapted selectively to adjust the aperture size in a camera lens to compensate for illumination changes, said apparatus comprising a barrel for supporting said lens and provided with a slot, a sector-shaped diaphragm plate having in the arcuate portion thereof three spaced apertures of progressively different size, the middle sized aperture being disposed in the radial center of said plate, the largest and smallest apertures being disposed at either side of said center aperture, said plate being pivotally mounted adjacent the apex thereof for angular rotation whereby each of said apertures may be registered with said lens depending on the angular position of said plate, means normally to maintain said plate at the center position, and means to deflect said plate in either direction to introduce said largest or smallest aperture depending on the direction of deflection, said means to deflect said plate including first and second photocells having different sensitivity characteristics related to the largest and smallest apertures respectively, and means coupled to the outputs of said cells to effect deflection of said plate in the appropriate direction.

5. Automatic diaphragm apparatus adapted selectively to adjust the aperture size in a camera lens to compensate for illumination changes, said apparatus comprising a barrel for supporting said lens and provided with a slot, a sector-shaped diaphragm plate having in the arcuate portion thereof three spaced apertures of progressively different size, the middle sized aperture being disposed in the radial center of said plate, the largest and smallest apertures being disposed at either side of said center aperture, said plate being pivotally mounted adjacent the apex thereof for angular rotation whereby each of said apertures may be registered with said lens depending on the angular position of said plate, first and second electromagnets disposed on either side of said lens barrel, a common armature intermediate said electromagnets and operatively coupled to the apex of said armature, whereby when said electromagnets are de-energized said plate is centered and when one of said electromagnets is energized said smallest aperture is registered with said lens and when the other of said electromagnets is energized the largest aperture is registered, and first and second photocells having different sensitivity characteristics related to said largest and smallest apertures, said cells being operatively coupled to said first and second electromagnets whereby the appropriate apertures are introduced.

6. Automatic diaphragm apparatus adapted selectively to adjust the aperture size in a camera lens to compensate for illumination changes, said apparatus comprising a barrel for supporting said lens and provided with a slot, a sector-shaped diaphragm plate having in the arcuate portion thereof three spaced apertures of progressively different size, the middle sized aperture being disposed in the radial center of said plate, the largest and smallest apertures being disposed at either side of said center aperture, said plate being pivotally mounted adjacent the apex thereof for angular rotation whereby each of said apertures may be registered with said lens depending on the angular position of said plate, first and second electromagnets disposed on either side of said barrel and mounted on opposing arms of a U-shaped yoke, a common armature intermediate said electromagnets and mounted on a flat spring whose end is attached to the mid-point of the base of said yoke, said armature being operatively coupled to the apex of said plate whereby when said electromagnets are de-energized said plate is centered and when one of said electromagnets is energized said smallest aperture is registered with said lens and when the other of said electromagnets is energized the largest aperture is registered, and a separate photocell coupled to each electromagnet, each cell having a predetermined light sensitivity characteristic such as to actuate the associated electromagnet to insert the related aperture only when incident illumination requires same.

References Cited in the file of this patent

UNITED STATES PATENTS

| | | |
|---|---|---|
| 599,556 | Flora | Feb. 22, 1898 |
| 2,013,362 | Riszdorfer | Sept. 3, 1935 |
| 2,193,325 | Riszdorfer | Mar. 12, 1940 |
| 2,251,473 | Touceda | Aug. 5, 1941 |
| 2,388,609 | Ericsson | Nov. 6, 1945 |
| 2,393,407 | Peterson | Jan. 27, 1946 |
| 2,421,476 | Belar et al. | June 3, 1947 |
| 2,662,457 | Fairbank | Dec. 15, 1953 |
| 2,683,402 | Bruck | July 13, 1954 |